T. W. FORD.
SHUTTER SIGNAL AND LOCK FOR CAMERAS.
APPLICATION FILED MAR. 24, 1917.

1,262,657.

Patented Apr. 16, 1918.

Witnesses
F. B. Wooden.
H. A. Mitchell.

T. W. Ford, Inventor,
by C. A. Snow & Co.
Attorneys

UNITED STATES PATENT OFFICE.

THOMAS WALLER FORD, OF CHATTANOOGA, TENNESSEE.

SHUTTER SIGNAL AND LOCK FOR CAMERAS.

1,262,657.  Specification of Letters Patent.  Patented Apr. 16, 1918.

Application filed March 24, 1917. Serial No. 157,201.

*To all whom it may concern:*

Be it known that I, THOMAS W. FORD, a citizen of the United States, residing at Chattanooga, in the county of Hamilton and State of Tennessee, have invented a new and useful Shutter Signal and Lock for Cameras, of which the following is a specification.

The present invention relates generally to cameras, and aims to provide a novel and improved shutter signal and lock, which is so constructed and operable that after an exposure has been made, a signal is provided to indicate that fact, and the shutter mechanism is locked to prevent the operation thereof until the exposed portion of the film or plate is removed from behind the lens, in which event the signal is removed and the shutter unlocked.

It is the object of the invention to provide a shutter signal and lock of the nature indicated which will prevent the double exposure of the sensitized surface or the destruction of an exposure previously made so as to "blank" the exposed sensitized surface, the present improvements being particularly useful to amateurs, and being of utility generally.

It is also the object of the invention to provide a device of the nature indicated which is comparatively simple and inexpensive in construction, which can be readily embodied in various cameras, by making appropriate changes or alterations within the scope of what is hereinafter claimed, and which is practical and effective in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein.

Figure 1:
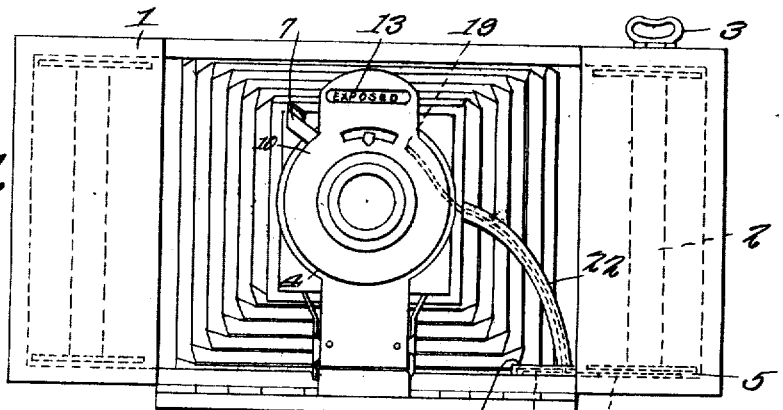
Figure 1 is a front view of a folding camera having the present improvements embodied therewith.

Although the device is illustrated as being applied to a folding camera, it will be understood by those skilled in the art, that the improvements can be used in various styles of cameras with equal success and propriety, suitable changes or alterations being made within the scope of what is claimed.

The camera illustrated embodies the casing or body 1 containing a spool or reel 2 for winding up a sensitized film, said spool being turned by means of a finger piece 3 as usual. The shutter mechanism is designated generally by the numeral 4 and is of ordinary construction, being connected by the bellows 5 with the casing or body. The shutter mechanism has the housing 6, the shutter operating lever or finger piece 7 pivoted therein and extending from said housing, and a lever 8 fulcrumed within the housing 6 and operated by the lever 7, the lever 8 being raised when the lever 7 is pressed, to operate the shutter. The details of the shutter operating mechanism are common and well known, and need not be illustrated or described.

In carrying out the invention, as illustrated, the housing 6 has an upstanding compartment 9 at the top thereof, which is also covered by the face plate 10 of the housing 6, and a signal member or plate 11 is slidable vertically within the compartment 9, the same being provided at its sides with guide flanges 12 for the member 11. Said member has printed or otherwise provided thereon the legend "Exposed," and the face plate 10 has an opening or slot 13 through which said legend can be readily seen when the member 11 is raised. The member 11 has upwardly and downwardly projecting stems 14 and 15 respectively slidable through the top of the compartment 9 and the upper portion of the housing 6, a coiled wire expansion spring 16 surrounding the stem 14 and being confined between the member 11 and upper portion of the compartment 9 to depress the member 11 when it is released. The stem 15 projects into the housing and coöperates with the lever 8, whereby when said lever is raised, this will raise the stem 15 and member 11.

Figure 4:
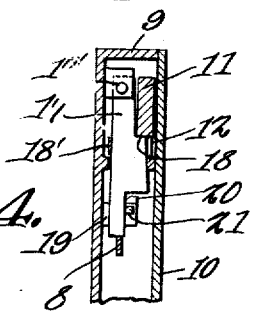
Fig. 4 is a section on the line 4—4 of Fig. 3.
Figure 5:
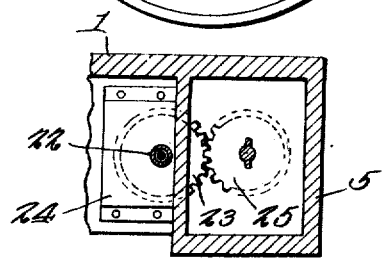
Fig. 5 is a section on the line 5—5 of Fig. 1 showing the gears.

As a means for holding the signal member 11 in raised signaling position and for locking the shutter mechanism, there is provided a depending latch 17 pivoted at its upper end, as at 17', within the compartment 9 and projecting downwardly into the housing 6 and back of the signal member 11. The latch 17 has an upwardly facing shoulder 18, and is pressed forwardly under the influence of a suitable spring 18', whereby when the member 11 is raised, the latch will snap forwardly to bring the shoulder 18 underneath the member 11 to hold it in raised position against the tension of the spring 16. When the member 11 is in lowered position, it will hold the latch 17 rearwardly, out of the path of movement of the lever 8, but when the member 11 is raised and the latch snapped forwardly, the lower end of the latch will overhang the lever 8 and prevent said lever from swinging upwardly, thus locking the shutter mechanism, as seen in Fig. 4.

As a means for releasing the latch from the signal member, there is provided a rotatable member 19 mounted within the housing 6, as illustrated, and having a radial cam 20 engageable with a cam lug 21, with which the latch 17 is provided, whereby when the member 19 is rotated the cam 20 in engaging the lug 21 will force the latch rearwardly to release the member 11 and move the latch rearwardly out of the path of movement of the lever 8.

The cam 20 is operated by the winding of the film upon the spool 2, in order that when the film has been wound a certain amount upon the spool to remove the exposed portion from in rear of the lens, the cam 20 will engage the lug 21 and release the signal and lock. A flexible shaft 22 of any suitable character has one end connected to the member 19 and its other end is connected to a spur gear 23 rotatable within a suitable housing 24 carried by the bottom of the casing or body 1, and the spur gear 23 meshes with a spur gear 25 which is rotatable with the spool 2, the spur gear 25 being mounted in any suitable manner within the casing or body, whereby when the spool 2 is rotated to wind up the film, this will rotate the gears and shaft 22.

Figure 2:
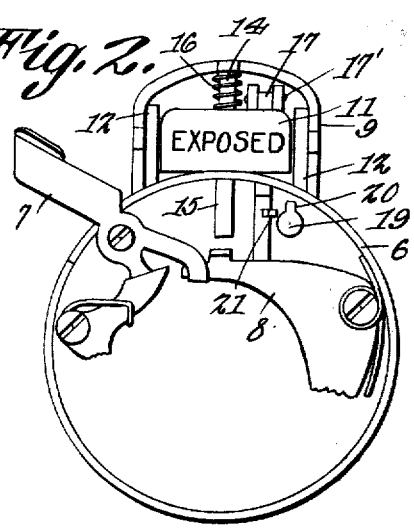
Fig. 2 is an enlarged elevation showing the working parts of the signal and lock in normal position.
Figure 3:
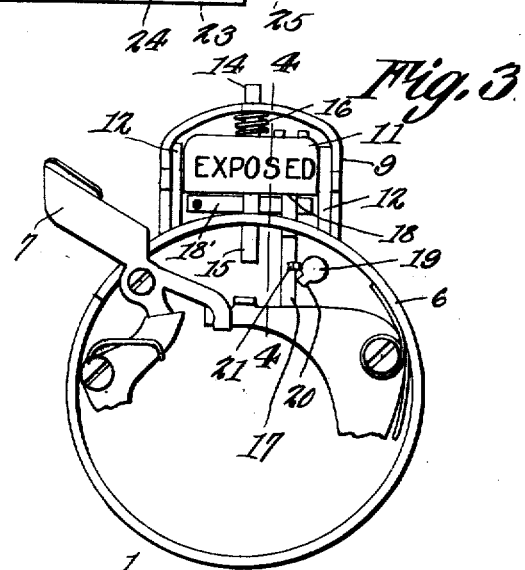
Fig. 3 is a view similar to Fig. 2 showing the parts in the position they assume after the shutter operating lever or finger piece has been pressed to make the exposure.

In operation, the cam 20 is normally moved past the lug 21, as seen in Fig. 2, thus releasing the latch. Now, when the lever or finger piece 7 is operated to make the exposure, the lever 8 is raised, and in bearing against the stem 15 will raise the signal member 11 to bring the legend "Exposed" behind the opening 13, the latch 17 snapping forwardly into engagement with the member 11 to hold it in signaling position, and when the lever 8 returns to normal lowered position, the latch will snap forwardly slightly farther to engage over said lever 8 and prevent the subsequent operation thereof until the latch is released. This will provide a signal indicating the fact that an exposure has been made. The shutter mechanism is also locked to prevent a second exposure until the exposed sensitized surface is removed. Thus, when the spool 2 is rotated to wind up the film thereon, the gear 25 will rotate the gear 23 and flexible shaft 22, which in turn rotates the member 19 and cam 20, and when said cam moves past the lug 21, it will press the latch rearwardly to release the signal member 11, and when said signal member is lowered by the spring 16, it will hold the latch 17 in its rearmost position out of the way of the lever 8. The exposure of the unexposed portion of the sensitized surface can then be made as before.

The operator can at any time tell whether the portion of the film behind the lens has been exposed, by observing whether or not the signal is in signaling position.

Having thus described the invention, what is claimed as new is:—

1. The combination with a camera having a shutter mechanism, of means movable from normal releasing position to lock said mechanism, means moved by said mechanism for normally holding the aforesaid means in normal position and when moved by said mechanism releasing the aforesaid means to lock said mechanism, the second mentioned means being in turn held, when moved, by the first mentioned means, and means for returning the first mentioned means to normal position.

2. The combination with a camera having a shutter mechanism, of a latch movable from normal releasing position to lock said mechanism against repeated operation, a member normally holding said latch in normal position and movable by said mechanism to release the latch, said member being in turn held, when moved by said mechanism, by the latch, and means for returning the latch to normal position.

3. The combination with a camera having a shutter mechanism, of a latch movable from normal position to lock said mechanism against repeated operation, a member normally holding said latch in normal position and movable by said mechanism to release the latch, said member being held, when moved by said mechanism, by the latch, and a rotatable member having a cam engageable with the latch for returning it to normal position.

4. The combination with a camera having a shutter mechanism, of a pivoted latch swingable from normal position to a locking position for preventing the repeated operation of said mechanism, a slidable member normally in one position to hold the latch in normal position and movable to another position when said mechanism is operated, the latch having means for holding said member when moved by said mechanism when the latch is moved to locking position, and means for returning the latch to normal position.

5. The combination with a camera having a shutter mechanism, of a signal member movable to signaling position when said mechanism is operated, a latch movable into engagement with said member when it is in signaling position and operable for locking said mechanism against repeated operation, means rotatable by the removal of a sensitized member from in rear of the shutter mechanism, a rotatable cam member for returning the latch to normal position, and a flexible shaft connecting the two last named means.

In testimony that I claim the foregoing as my own, I have hereto affixed my signature in the presence of two witnesses.

THOMAS WALLER FORD.

Witnesses:
 Geo. W. Wagner,
 L. A. Downer.